(12) United States Patent
Demain

(10) Patent No.: US 6,720,388 B1
(45) Date of Patent: Apr. 13, 2004

(54) POLYPROPYLENE FIBRES

(75) Inventor: Axel Demain, Tourinnes-Saint-Lambert (BE)

(73) Assignee: Atofina Research S.A., Feluy (BE)

( * ) Notice: Subject to any disclaimer, the term of this patent is extended or adjusted under 35 U.S.C. 154(b) by 0 days.

(21) Appl. No.: 09/937,425

(22) PCT Filed: Mar. 28, 2000

(86) PCT No.: PCT/EP00/02878

§ 371 (c)(1),
(2), (4) Date: Jan. 24, 2002

(87) PCT Pub. No.: WO00/60149

PCT Pub. Date: Oct. 12, 2000

(30) Foreign Application Priority Data

Mar. 30, 1999 (EP) .............................................. 99106462

(51) Int. Cl.⁷ .......................... C08L 23/00; C08L 23/04; D21H 11/00; D21H 13/00; D21H 17/00

(52) U.S. Cl. ................. 525/240; 162/157.2; 162/157.4; 162/157.5; 210/348; 428/364; 442/327; 442/60; 442/361; 442/365; 602/41; 602/42; 602/45; 604/367; 604/372; 604/373

(58) Field of Search ........................ 525/240; 162/157.2, 162/157.4, 157.5; 210/348; 428/364; 442/327, 60, 361, 365; 602/41, 42, 45; 604/367, 372, 373

(56) References Cited

U.S. PATENT DOCUMENTS

| | | |
|---|---|---|
| 5,269,807 A | 12/1993 | Liu |
| 5,648,428 A | 7/1997 | Reddy et al. |
| 6,407,177 B1 * | 6/2002 | Shamshoum et al. ....... 525/240 |

FOREIGN PATENT DOCUMENTS

| | | |
|---|---|---|
| EP | 0414047 A2 | 2/1991 |
| EP | 0451743 A2 | 10/1991 |
| EP | 0634505 A1 | 1/1995 |
| EP | 0747403 A1 | 12/1996 |
| EP | 0789096 A1 | 8/1997 |
| WO | WO 9635729 A1 | 11/1996 |
| WO | WO 9623095 A1 | 2/1998 |

* cited by examiner

*Primary Examiner*—Nathan M. Nutter
(74) *Attorney, Agent, or Firm*—William D. Jackson

(57) ABSTRACT

A polypropylene blend including from 0.5 to 50% by weight of a syndiotactic polypropylene having a multimodal molecular weight distribution and at least 50% by weight of an isotactic polypropylene.

22 Claims, No Drawings

POLYPROPYLENE FIBRES

The present invention relates to polypropylene fibres and to fabrics produced from polypropylene fibres.

Polypropylene is well known for the manufacture of fibres, particularly for manufacturing non woven fabrics.

EP-A-0789096 discloses such polypropylene fibres which are made of a blend of syndiotactic polypropylene (sPP) and isotactic polypropylene (iPP). That specification discloses that by blending from 0.3 to 3% by weight of sPP, based on the total Wj polypropylene, to form a blend of iPP-sPP, the fibres have increased natural bulk and smoothness, and non-woven fabrics produced from the fibres have an improved softness. Moreover, that specification discloses that such a blend lowers the thermal bonding temperature of the fibres. Thermal bonding is employed to produce the non-woven fabrics from the polypropylene fibres. The specification discloses that the isotactic polypropylene comprises a homopolymer formed by the polymerisation of propylene by Ziegler-Natta catalysis.

WO-A-96/23095 discloses a method for providing a non-woven fabric with a wide bonding window in which the non-woven fabric is formed from fibres of a thermoplastic polymer blend including from 0.5 to 25 wt % of syndiotactic polypropylene. The syndiotactic polypropylene may be blended with a variety of different polymers, including isotactic polypropylene. The specification includes a number of examples in which various mixtures of syndiotactic polypropylene with isotactic polypropylene were produced. The isotactic polypropylene comprised commercially available isotactic polypropylene, which is produced using a Ziegler-Natta catalyst. It is disclosed in the specification that the use of syndiotactic polypropylene widens the window of temperature over which thermal bonding can occur, and lowers the acceptable bonding temperature.

WO-A-96/23095 also discloses the production of fibres from blends including syndiotactic polypropylene which are either bi-component fibres or bi-constituent fibres. Bi-component fibres are fibres which have been produced from at least two polymers extruded from separate extruders and spun together to form one fibre. Bi-constituent fibres are produced from at least two polymers extruded from the same extruder as a blend. Both bi-component and bi-constituent fibres are disclosed as being used to improve the thermal bonding of Ziegler-Natta polypropylene in non-woven fabrics. In particular, a polymer with a lower melting point compared to the Ziegler-Natta isotactic polypropylene, for example polyethylene, random copolymers or terpolymers, is used as the outer part of the bi-component fibre or blended in the Ziegler-Natta polypropylene to form the bi-constituent fibre.

EP-A-0634505 discloses improved propylene polymer yarn and articles made therefrom in which for providing yarn capable of increased shrinkage syndiotactic polypropylene is blended with isotactic polypropylene with there being from 5 to 50 parts per weight of syndiotactic polypropylene. It is disclosed that the yarn has increased resiliency and shrinkage, particularly useful in pile fabric and carpeting. It is disclosed that the polypropylene blends display a lowering of the heat softening temperature and a broadening of the thermal response curve as measured by differential scanning calorimetry as a consequence of the presence of syndiotactic polypropylene.

U.S. Pat. No. 5,269,807 discloses a suture fabricated from syndiotactic polypropylene exhibiting a greater flexibility than a comparable suture manufactured from isotactic polypropylene. The syndiotactic polypropylene may be blended with, inter alia, isotactic polypropylene.

EP-A-0451743 discloses a method for moulding syndiotactic polypropylene in which the syndiotactic polypropylene may be blended with a small amount of a polypropylene having a substantially isotactic structure. It is disclosed that fibres may be formed from the polypropylene. It is also disclosed that the isotactic polypropylene is manufactured by the use of a catalyst comprising titanium trichloride and an organoaluminium compound, or titanium trichloride or titanium tetrachloride supported on magnesium halide and an organoaluminium compound, i.e. a Ziegler-Natta catalyst.

EP-A-0414047 discloses polypropylene fibres formed of blends of syndiotactic and isotactic polypropylene. The blend includes at least 50 parts by weight of the syndiotactic polypropylene and at most 50 parts by weight of the isotactic polypropylene. It is disclosed that the extrudability of the fibres is improved and the fibre stretching conditions are broadened.

U.S. Pat. No. 5,648,428 discloses a process for producing a polymer blend in a single reactor, specifically a polymer blend of isotactic polyolefin and syndiotactic polyolefin which may comprise polypropylene. The single reactor is provided with a catalyst system comprising a combination of at least one metallocene catalyst and at least one conventional supported Ziegler-Natta catalyst.

These known polypropylenes suffer from the disadvantage that the processability of the iPP/sPP blends needs to be improved, particularly for spinning fibres, so that higher spinning speeds can be employed before fibre breakage occurs or the incidence of breakage at any given spinning speed is reduced.

It is further known to produce syndiotactic polypropylene using metallocene catalysts as has been disclosed for example in U.S. Pat. No. 4,794,096.

WO-A-96/35729 discloses a process for preparing and using a supported metallocene-alumoxane catalyst which is used for the polymerisation or copolymerisation of olefins to produce an olefin polymer or copolymer having a broad and bimodal molecular weight distribution.

It is an aim of the present invention to produce a blend of iPP and sPP which has improved processability, particularly when forming spun fibres. It is a further aim of the present invention to provide fibres, and fabrics in particular non-woven fabrics made from those fibres, which have been produced from that blend.

The present invention provides a polypropylene blend including from 0.3 to 50% by weight of a syndiotactic polypropylene having a multimodal molecular weight distribution and at least 50% by weight of an isotactic polypropylene.

The SPP is typically bimodal.

The isotactic polypropylene (iPP) may have been produced using a Ziegler-Natta catalyst and may be a homopolymer or copolymer and may have a monomodal or multimodal molecular weight distribution.

Preferably, the syndiotactic polypropylene (sPP) concentration in the sPP/iPP blend is from 0.3 to 15 wt %, more preferably from 1 to 10 wt %. The fibre may be a two component sPP/iPP blend.

Preferably, the iPP is a homopolymer, copolymer, being either a random or block copolymer, or terpolymer of isotactic polypropylene.

Typically, the isotactic polypropylene has a melting temperature in the range of from 159 to 169° C., more typically from 161 to 165° C. The iPP employed in accordance with the invention has a molecular weight distribution typically having a dispersion index D of from 3.5 to 9, more preferably from 3.5 to 6.5. The dispersion index D is the ratio Mw/Mn, where Mw is the weight number average molecular weight and Mn is the number average molecular weight of the polymer. The iPP typically has a peak in the molecular weight distribution of around 35,000 to 60,000 kDa. The isotactic polypropylene may have an Mn of from 35,000 to 45,000 kDa.

The isotactic polypropylene preferably has a melt flow index (MFI) of from 1 to 90 g/10 mins, more preferably from 10 to 60 g/10 mins. In this specification the MFI values are those determined using the procedure of ISO 1133 using a load of 2.16 kg at a temperature of 230° C.

The properties of two typical iPP resins for use in the invention are specified in Table 1.

The multimodal sPP, preferably bimodal sPP, is preferably a homopolymer or a random copolymer with a comonomer content of from 0.1 to 1.5 wt %, more preferably from 0.1 to 1 wt %. The multimodal sPP may however be a block copolymer with a higher comonomer content or a terpolymer. If the comonomer content is above 1.5 wt %, the sPP tends to become sticky, thus resulting in problems when spinning the fibres or thermally bonding the fibres. The comonomer content is selected so as to decrease the melting point of the sPP/iPP blend below 130° C. A lower melting point can also be obtained by using particular catalysts and/or process conditions during polymerisation of the sPP. Preferably, the sPP has a melting temperature of up to about 130° C. The sPP typically has two melting peaks, one being around 110° C. and the other being around 125° C. The sPP typically has an MFI of from 0.1 to 1000 g/10 min, more typically from 1 to 60 g/10 min. The multimodal sPP may have an Mn of from 35,000 to 40,000 kDa. The properties of a typical bimodal sPP for use in the invention are specified in Table 1.

The sPP has a slightly narrower molecular weight distribution than for the iPP, wherein typically D may be from 3 to 6, more typically around 4 and has a peak of the molecular weight distribution at around 20,000 to 35,000 kDa. The sPP and the iPP may have substantially similar values for Mn. In view of the closeness between the peaks and the overlap of the molecular weight distributions of the sPP and the iPP, those two components can readily be blended together.

The present invention further provides a fibre produced from the polypropylene blend in accordance with the invention.

The present invention further provides a fabric produced from the polypropylene fibre of the invention.

The present invention yet further provides a product including that fabric, the product being selected from among others a filter, personal wipe, diaper, feminine hygiene product, incontinence product, wound dressing, bandage, surgical gown, surgical drape and protective cover.

The present invention is predicated on the discovery by the present inventor that when blended with iPP, multimodal sPP, preferably bimodal sPP, improves the processability of the polypropylene, particularly to form fibres in a spinning process, as compared to monomodal sPP.

The present inventor has found that when used in an amount of only about 2 wt % sPP in the sPP/iPP blend, the spinnability is increased when sPP is multimodal, preferably bimodal.

The use of multimodal e.g. bimodal sPP in blends with iPP in accordance with the invention tends to provide fibres which can be more readily-spun as compared to known fibres comprised of iPP blended with monomodal sPP. The molecular weight distributions of iPP and the multimodal sPP overlap, and as a result of the provision of sPP having a broad multimodal molecular weight distribution this provides increased overlap between the two distributions as compared to monomodal sPP, thereby improving the blend, and also provides a higher proportion of short chains in the combined molecular weight distribution for the blend. This has been found to result in an increase in the maximum spin speed before breakage for the fibres of the multimodal sPP/iPP blends in accordance with the invention.

The fibres produced in accordance with the invention may be either bi-component fibres or bi-constituent fibres. For bi-component fibres, iPP and sPP are fed into two different extruders. Thereafter the two extrudates are spun together to form single fibres. For the bi-constituent fibres, blends of sPP/iPP are obtained by: dry blending pellets, flakes or fluff of the two polymers before feeding them into a common extruder; or using pellets or flakes of a blend of sPP and iPP which have been extruded together and then re-extruding the blend from a second extruder.

When the blends of multimodal aPP/iPP are used to produce fibres in accordance with the invention, for the production of spunlaid fibres, a typical extrusion temperature would be in the range of from 200° C. to 260° C., most typically from 230° C. to 250° C. For the production of staple fibres, a typical extrusion temperature would be in the range of from 230° C. to 330° C., most typically from 280° C. to 300° C.

The fibres produced in accordance with the invention may be produced from multimodal sPP/iPP blends having other additives to improve the mechanical processing or spinnability of the fibres. The fibres produced in accordance with the invention may be used to produce non-woven fabrics for use in filtration; in personal care products such as wipers, diapers, feminine hygiene products and incontinence products; in medical products such as wound dressings, surgical gowns, bandages and surgical drapes; in protective covers; in outdoor fabrics and in geotextiles. Non-woven fabrics made with the bimodal sPP/iPP fibres of the invention can be part of such products, or constitute entirely the products. As well as making non-woven fabrics, the fibres may also be employed to make a woven knitted fabric or mat. The non-woven fabrics produced from the fibres in accordance with the invention can be produced by several processes, such as air through blowing, melt blowing, spun bonding or bonded carded processes. The fibres of the invention may also be formed as a non-woven spunlace product which is formed without thermal bonding by fibres being entangled together to form a fabric by the application of a high pressure-fluid such as air or water.

The present invention will now be described in greater detail with reference to the following-non-limiting example.

Example 1 and Comparative Example 1

In accordance with Example 1, a bimodal sPP having a dispersion index D of 3.9 and an MFI of 4.4 g/10 min was blended in an amount of 2 wt % based on the weight of the blend with an isotactic polypropylene having the properties of Polymer 1 specified in Table 1. The blend was then subjected to spinning through a spinnerette to form fibres and the maximum spinning speed before breakage of the fibres was measured at two spinning temperatures. The results are shown in Table 2.

In accordance with Comparative Example 1, a monomodal sPP having a dispersion index D of 2.6 and an MFI of 4.5 g/10 min, i.e. an MFI substantially the same as that of the bimodal sPP of Example 1, was blended, also in an amount of 2 wt % based on the weight of the blend, with the same isotactic polypropylene employed in Example 1. The resultant blend was similarly spun to form fibres at the same temperatures as for Example 1 and the results are also shown in Table 2.

It may be seen that for both spinning temperatures of 260° C. and 280° C., the use of bimodal sPP substantially increases the maximum spinning speed before breakage of the fibres as compared to the use of the same amount of monomodal sPP blended with the same isotactic polypropylene.

TABLE 1

|  |  | Bimodal sPP | iPP - Polymer 1 | iPP Polymer 2 |
|---|---|---|---|---|
| MI$_2$ | g/10 min | 3.6 | 25.9 | 14 |
| Tm | ° C. | 110 and 127 | 163.4 | 164.3 |
| Mn | kDa | 37426 | 35756 | 41983 |
| Mw | kDa | 160229 | 192383 | 256895 |
| Mz | kDa | 460875 | 755427 | 1173716 |
| Mp | kDa | 50516 | 96230 | 107648 |
| D |  | 4.3 | 5.4 | 6.1 |

TABLE 2

|  | Example 1 | Comparative Example 1 |
|---|---|---|
| Property | iPP-2 wt % bimodal sPP | iPP-2 wt % monomodal sPP |
| Maximum spinning speed at 260° C. | 3700 | 3300 |
| Maximum spinning speed at 280° C. | 3100 | 2900 |

What is claimed is:

1. A polypropylene blend including from 0.3 to 50% by weight of a syndiotactic polypropylene having a multimodal molecular weight distribution and at least 50% by weight of an isotactic polypropylene.

2. A blend according to claim 1 wherein the multimodal sPP concentration in the sPP/iPP blend is from 0.5 to 15 wt %.

3. A blend according to claim 2 wherein the multimodal sPP concentration in the sPP/iPP blend is from 1 to 10 wt %.

4. A blend according to any foregoing claim 3 wherein the iPP is a homopolymer, copolymer or terpolymer of isotactic polypropylene.

5. A blend according to any foregoing claim 1 wherein the iPP has a dispersion index (D) of from 3.5 to 9, preferably 3.5 to 6.5.

6. A blend according to any foregoing claim 1 wherein the iPP has a melting temperature in the range of from 159 to 169° C.

7. A blend according to any foregoing claims 4 to 6 wherein the iPP has an Mn of from 35,000 to 60,000 kDa.

8. A blend according to any foregoing claim 7 wherein the iPP has a melt flow index (MFI) of from 1 to 90 g/10 mins.

9. A blend according to any foregoing claim 6 wherein the multimodal sPP is a homopolymer or a random or block copolymer or a terpolymer.

10. A blend according to any foregoing claim 6 wherein the multimodal sPP has a melting temperature of up to about 130° C.

11. A blend according to any foregoing claim 10 wherein the multimodal sPP has an MFI of from 0.1 to 100 g/10 min.

12. A blend according to claim 11 wherein the multimodal sPP has an MFI of from 1 to 60 g/10 min.

13. A blend according to any foregoing claim 1 wherein the multimodal sPP has an Mn of from 35,000 to 40,000 kDa.

14. A blend according to any foregoing claim 1 wherein the multimodal sPP has a dispersion index (D) of from 3 to 6.

15. A blend according to any foregoing claim 1 wherein the multimodal sPP is bimodal.

16. A spun polypropylene fiber produced from the polypropylene blend of any foregoing claim 1.

17. A fabric produced from the polypropylene fiber according to claim 16.

18. A product including a fabric according to claim 17, the product being selected from a filter, personal wipe, diaper, feminine hygiene product, incontinence product, wound dressing, bandage, surgical gown, surgical drape and protective cover.

19. A process for producing polypropylene fibers at an enhance spinning speed when producing spun polypropylene fibres fibers by spinning a polypropylene blend, of from 0.3 to 50 wt % multimodal syndiotactic polypropylene in a blend with at least 50 wt % of an isotactic polypropylene.

20. A blend according to claim 1 wherein the iPP has a dispersion index (D) of from 3.5 to 6.5.

21. A blend according to claim 20 wherein the multimodal sPP concentration in the sPP/iPP blend is from 1 to 10 wt %.

22. A blend according to claim 1 wherein said blend is a physical blend of said syndiotactic polypropylene and said isotactic polypropylene which are separately produced and then blended together.

* * * * *

UNITED STATES PATENT AND TRADEMARK OFFICE
CERTIFICATE OF CORRECTION

PATENT NO. : 6,720,388 B1
DATED : April 13, 2004
INVENTOR(S) : Axel Demain

It is certified that error appears in the above-identified patent and that said Letters Patent is hereby corrected as shown below:

Column 1,
Line 11, replace "total Wj polypropylene," with -- total polypropylene --.

Column 4,
Line 20, replace "aPP/iPP" with -- sPP/iPP --.

Column 5,
Line 43, replace "to any foregoing claim 3" with -- to claim 3 --.
Lines 46 and 49, replace "to any foregoing claim 1" with -- to claim 1 --.

Column 6,
Line 1, replace "to any foregoing claims 4 to 6" with -- to claim 6 --.
Line 3, replace "to any foregoing claim 7" with -- to claim 7 --.
Lines 5 and 8, replace "to any foregoing claim 6" with -- to claim 6 --.
Line 11, replace "to any foregoing claim 10" with -- to claim 10 --.
Lines 15, 18, 21 and 24, replace "to any foregoing claim 1" with -- to claim 1 --.

Signed and Sealed this

Thirtieth Day of August, 2005

JON W. DUDAS
*Director of the United States Patent and Trademark Office*